United States Patent [19]

Kulak

[11] 4,437,256

[45] Mar. 20, 1984

[54] UNIVERSAL FLOAT LURE

[76] Inventor: Walter Kulak, 98 Oakdale Village, North Brunswick, N.J. 08902

[21] Appl. No.: 258,959

[22] Filed: Apr. 30, 1981

[51] Int. Cl.$^3$ ............... A01K 85/01; A01K 93/00
[52] U.S. Cl. .................... 43/17.5; 43/17.6; 43/42.22; 43/42.33; 43/42.35; 43/43.14
[58] Field of Search .............. 43/17.5, 17.6, 42.22, 43/42.39, 42.32, 42.35, 43.14, 43.1, 41, 42.33

[56] References Cited

U.S. PATENT DOCUMENTS

| | | | |
|---|---|---|---|
| 2,002,135 | 5/1935 | Barton | 43/17.6 |
| 2,314,521 | 3/1943 | Schwartz | 43/17.6 |
| 2,638,697 | 5/1953 | Schwartz | 43/41 X |
| 2,665,511 | 1/1954 | Bradberry | 43/42.39 X |
| 2,706,359 | 4/1955 | Beames | 43/42.22 X |
| 2,754,610 | 7/1956 | Carlson | 43/17.6 |
| 2,994,983 | 8/1961 | Best | 43/41 |
| 3,177,604 | 4/1965 | Ewing | 43/17.5 |
| 3,670,447 | 6/1972 | Wohead | 43/43.14 |
| 3,693,278 | 9/1972 | Mahone | 43/17.5 |
| 3,705,465 | 12/1972 | Charney | 43/42.33 |
| 3,863,380 | 2/1975 | Purlia | 43/42.39 X |
| 3,940,868 | 3/1976 | Northcutt | 43/17.6 |
| 3,990,172 | 11/1976 | Hagquist | 43/43.14 |
| 4,250,651 | 2/1981 | Ramme | 43/42.35 |

FOREIGN PATENT DOCUMENTS 16151  3/1907  Norway ..................... 43/42.32

Primary Examiner—Nicholas P. Godici
Assistant Examiner—Charles L. Willis
Attorney, Agent, or Firm—Sprung, Horn, Kramer & Woods

[57] ABSTRACT

A universal float-lure is provided for the production of light and sparkling motion. A light emitting diode cartridge is insertable into the clear plastic main body of the float-lure. A self-contained clear plastic cylinder is also insertable in the main body of the float-lure. The cylinder contains highly polished metal balls and metallic particles suspended in clear oil. The balls impart movement to the metallic particles so when light hits the particles a sparkling glitter effect comparable to a skin effect of a living organism is produced.

12 Claims, 14 Drawing Figures

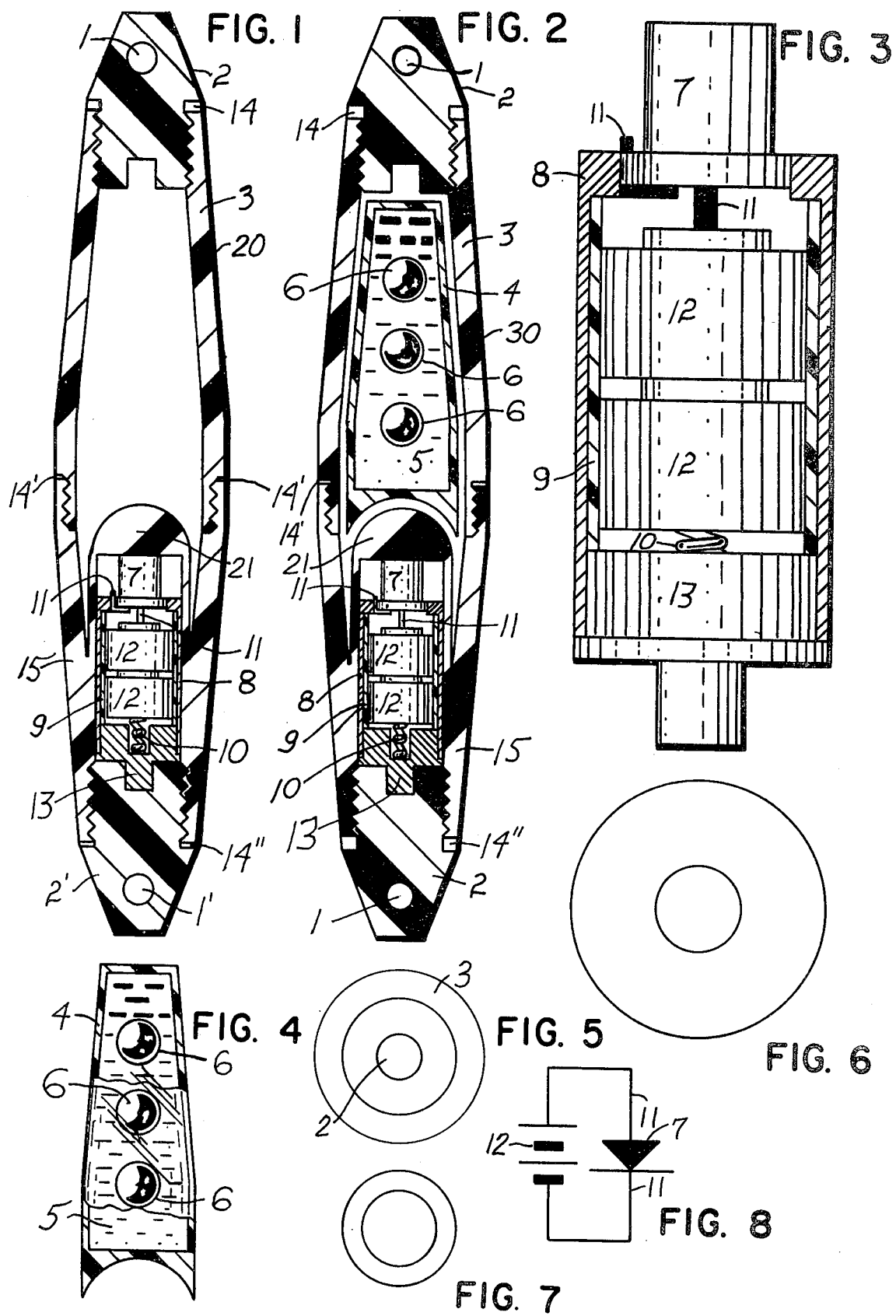

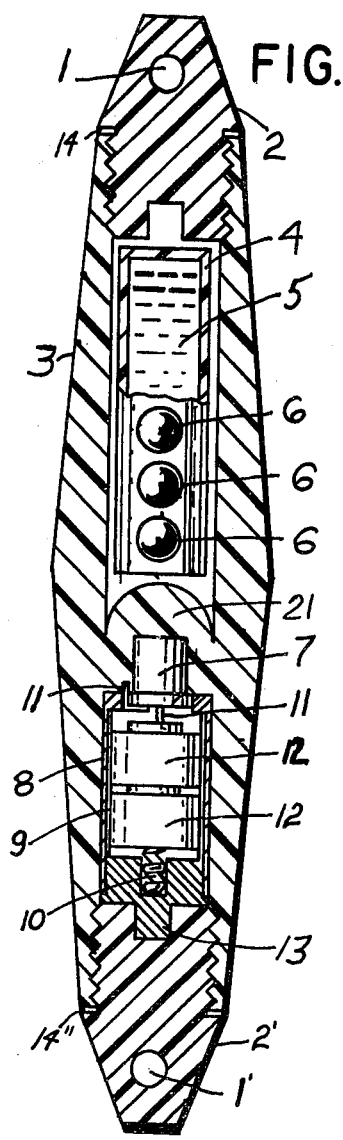
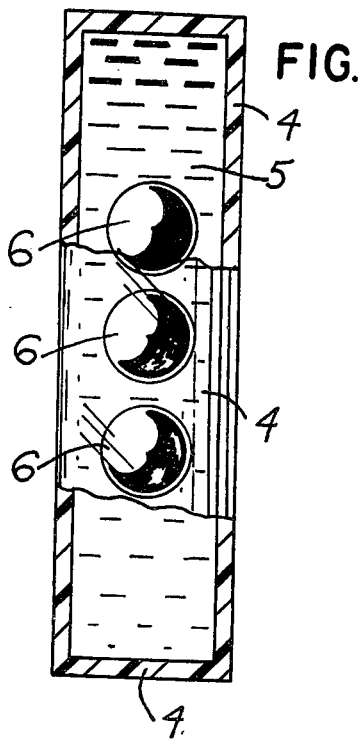
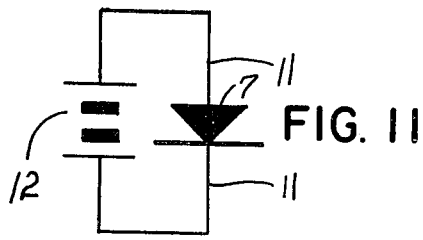
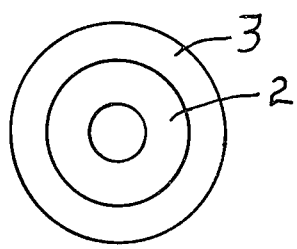
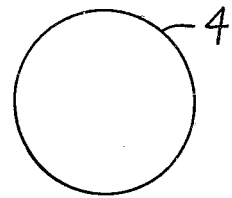
FIG. 9
FIG. 10
FIG. 11
FIG. 12
FIG. 13

UNIVERSAL FLOAT LURE

BACKGROUND OF THE INVENTION

The present invention relates to a universal float-lure.

SUMMARY OF THE INVENTION

This invention concerns a float-lure providing light and sparkling motion produced by a light emitting diode cartridge, powered by two miniature hearing aid batteries 13 series. The battery cartridge is inserted into the universal float-lure's clear (see through) plastic main body from one end thereof.

The main body has a built-in lens which in turn delivers a concentrated beam of light of any desirable color to the end of the float-lure opposite the batteries. The float-lure can be used during the day or night and in fresh or salt water.

A self-contained (see through) plastic cylinder containing in combination clear (see through) oil, metallic reflecting particles and highly polished balls can be inserted in the float-lure. The metallic reflective particles are suspended in the oil. The highly polished balls induce motion to the metallic reflecting particles and impart a mirror light deflection of 360 degrees with the balls striking the metallic reflecting particles in all directions as the balls and particles are illuminated. The particles are thus propelled in a rotating fashion with the highly polished balls giving a moving sparkling glitter effect of a living organism (skin effect of a living organism) to the universal float-lure and such effect is not dependent on the sun for deflection to lure fish.

By removing the self-contained plastic cylinder from the universal float-lure, the universal float-lure becomes a float with a light for night fishing, or can act as a surface lure.

When the battery cartridge and self-contained plastic cylinder are removed from the universal float-lure, the float-lure behaves like a conventional float, but it still retains its built-in controlled depth of buoyancy or flotation to produce the desired resistance so that fish do not detect drag.

As one starts to load the universal float-lure with different combinations, the whole horizon of a real unique well built universal float-lure which has no end as to the possibilities of uses becomes apparent. Not only can the float-lure be used in fishing lures and floats, but other useful purposes are possible, such as a miniature flashlight, as a warning light for disabled cars (such as when changing a flat tire)—there is no end to the possibilities of uses.

When one loads the universal float-lure with two battery cartridges having different color light emitting diodes on each end of the main body, one can have different color light coming from each end of the float-lure. This will form mingling radiant rainbow colors to enhance the use of the device of this invention as a float or lure.

One can use only one light if one desires, or one can use two lights. The universal float-lure of this invention has the advantages of not requiring a whole bunch of tackle associated with it, but yet is versatile, adaptable and is contained in one unique package.

The life of the batteries for use in the float-lure is 24 to 30 hours of constant use.

The threaded end cap of the float-lure can be removed and filled with water to the desirable level to produce the desired floatation and drag.

The universal float-lure can also be used as a surface lure in fresh or salt water and can be changed from one to the other immediately.

When the self-contained plastic cylinder is removed, the float-lure can be filled with a solution, i.e., any solution of any color including live bait, and can thus be used as a lure.

Light emitting diodes can be used in a variety of color to produce light of these colors.

Threaded end caps for use in the present invention can be made from metal, preferably chrome plated metal when the universal float-lure has to be sunk far or for use in a deeper level body of water.

Plastic for use in the present invention is injection molded from clear (see through) acrylic plastic.

The battery cartridge is metal, such as aluminum, or brass if desired.

The metal threaded end caps can be machined by a screw machine.

The universal float-lure can be broken down and produced only as a float or lure independently as shown in the drawings.

BRIEF DESCRIPTION OF THE DRAWINGS

FIG. 1 is an elevational view in cross-section of a universal float according to the present invention.

FIG. 2 is an elevational view in cross-section of universal float-lure according to the present invention.

FIG. 3 is a cross-sectional exploded view of the battery cartridge depicted in FIG. 1 and FIG. 2.

FIG. 4 is an elevational view in cross-section of a self-contained plastic cylinder depicted in FIG. 2.

FIG. 5 is a top plan view of the devices shown in FIG. 1 and FIG. 2.

FIG. 6 is an end view of the cartridge shown in FIG. 3.

FIG. 7 is a top plan view of the cylinder shown in FIG. 4.

FIG. 8 is a schematic diagram of the energized light emitting diode circuit as shown in cross-section in FIG. 3.

FIG. 9 is an elevational view in cross-section of another universal float-lure according to the present invention.

FIG. 10 is an elevational view in cross-section of another self-contained plastic cylinder, as depicted in FIG. 9.

FIG. 11 is a schematic diagram showing the circuit depicted in FIG. 8 with the polarity of the batteries reversed when the batteries are not in use (negative side to negative side) to keep the batteries from discharging.

FIG. 12 is a top plan view of the device shown in FIG. 9.

FIG. 13 is a top plan view of the cylinder shown in FIG. 10.

DETAILED DESCRIPTION OF THE INVENTION

Figure 14:
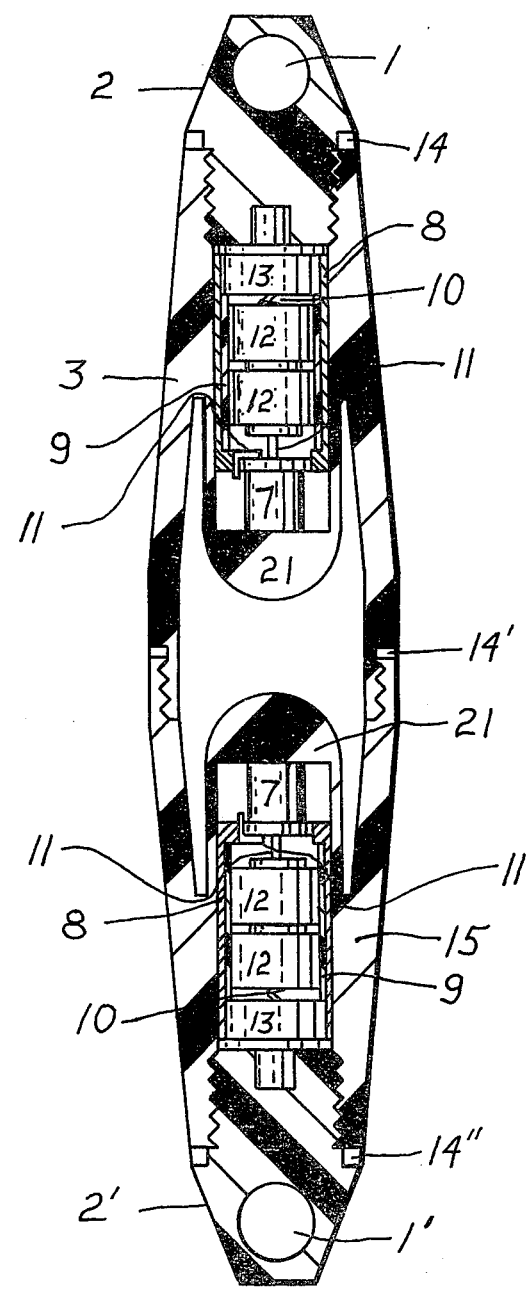
FIG. 14 is an elevational view in cross-section of a universal float having two light emitting diode cartridges.

Referring to the drawings in detail, in FIG. 1 a float 20 according to the present invention is shown. At each end of the float are threaded end caps 2 and 2' which have holes 1 and 1' to accommodate a line and hook. As shown in FIG. 1 (and in FIG. 2 and FIG. 9) the threaded end caps 2 and 2' are chamfered at 22 degree angles. Threaded end cap 2 is screwed into threaded main body 3. Threaded end cap 2' is screwed into threaded main body 15. Threaded main body 3 has male threads at its end opposite end cap 2, such threads connect with female threads at the end opposite end cap 2' of threaded main body 15. As shown in FIG. 1 (and in FIG. 2 and FIG. 9), the point of contact of main body 3 to main body 15 has an excluded angle of 5 degrees.

Rubber seals 14, 14' and 14" are disposed respectively between end cap 2 and main body 3; main body 3 and main body 15; and main body 15 and end cap 2'.

Within main body 15 is a battery cartridge 8 composed of a light emitting diode 7 connected to batteries 12 at one end by light emitting diode leads 11. One lead 11 goes to the negative side of the batteries 12 while the other lead 11 is pressed into the battery cartridge wall to make a positive connection to the other side of batteries 12. At the other end of batteries 12 is a spring 10. The spring 10 is interposed between batteries 12 and the battery cartridge end cap 13. The cartridge end cap 13 is held in place by threaded end cap 2'. Encasing the light emitting diode leads 11, batteries 12, spring 10 and battery cartridge end cap 13, is a plastic insulator sleeve 9.

Disposed above the light emitting diode 7 is lens 21.

In FIG. 2, a float-lure 30 according to the invention is depicted. FIG. 2 is the same float-lure as shown as FIG. 1 except the empty cavity in main body 3 has inserted therein a self-contained plastic cylinder 4 having metallic reflecting particles in oil 5 and highly polished balls 6.

FIG. 9 depicts a float-lure similar to that depicted in FIG. 2, except a one piece main body 3 is employed and the shape of the self-contained plastic cylinder is slightly different.

What is claimed is:

1. A float-lure kit comprising
   a. an elongated main body section having at least two hollow areas therein and access means to said hollow areas from outside said main body section,
   b. a self-contained lure cylinder insertable through one of said access means into one of said hollow areas, said cylinder comprising therein
      i. oil,
      ii. one or more metal balls and
      iii. metallic reflecting particles,
         said balls and said particles suspended in said oil, and
   c. a light emitting diode containing cartridge insertable through one of said access means in one of said hollow areas.

2. A float-lure kit according to claim 1, wherein said light emitting diode cartridge comprises
   a. a light emitting diode,
   b. electrical leads,
   c. a battery cartridge,
   d. a battery cartridge end cap,
   e. a spring, said spring disposed at one end of said cartridge between said end cap and said batteries,
   f. one or more batteries, said leads connecting said diode to said batteries, and
   g. a plastic insulator sleeve, said batteries disposed in said plastic insulator sleeve, said sleeve disposed within said battery cartridge.

3. A float-lure kit according to claim 2, wherein said batteries are miniature hearing aid batteries 13 series.

4. A float-lure kit according to claim 1, wherein said light emitting diode cartridge emits a colored beam of light.

5. A float-lure kit according to claim 1, wherein there are at least two light emitting diode cartridges, each of said cartridges emitting a different color beam of light.

6. A float-lure kit according to claim 1, wherein said access means comprise threaded end caps at opposite ends of said main body section.

7. A float-lure kit according to claim 6, wherein said threaded end caps are fabricated from clear plastic.

8. A float-lure kit according to claim 6, wherein at least one of said threaded end caps has a hole therethrough for receiving a line and hook.

9. A float-lure kit according to claim 1, wherein said main body section includes two subsections which are thread connected to each other.

10. A float-lure kit according to claim 1, wherein said main body section is fabricated from clear plastic.

11. A float-lure kit according to claim 1, wherein said cylinder is fabricated from clear plastic.

12. A float-lure kit according to claim 1, wherein at least one of said hollow areas can accommodate a liquid, said liquid introducable into said hollow area through one of said access means.

* * * * *